United States Patent Office 2,978,503
Patented Apr. 4, 1961

2,978,503

PREPARATION OF N-(NITROALKYL)AMIDES

Karl Klager, Monrovia, Calif., assignor to Aerojet-General Corporation, Azusa, Calif., a corporation of Ohio No Drawing. Filed Dec. 9, 1954, Ser. No. 474,284

14 Claims. (Cl. 260—561)

This invention relates to a new method of preparing nitro-substituted amides. In particular, it relates to a method of preparing N-nitroalkyl substituted amides having the general formula:

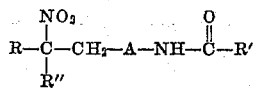

wherein R and R″ are the same or different and are hydrogen, nitro or alkyl radicals, R′ is an alkenyl radical, and A is an alkylene radical.

The valuable nitro compounds of this invention readily undergo addition polymerization to form oxygen rich resins which are useful as coatings for solid propellants. The manner of using the nitro compounds of this invention as a coating for solid propellant grains is well known. The solid grain can be dipped in the liquid monomer of the nitro-substituted amide to give the grain a coating of the liquid. The coating is then polymerized to form a solid resin which will be intermediately adherent to the grain. This polymerization is preferably done by adiabatic heating of the coated grain at a temperature sufficient to polymerize and thus solidify the coating within a reasonably short time. The polymerization can conveniently be done for example at a temperature of about 210° F. to 220° F., and will usually require about four hours. The manner of doing this is described in detail in the copending Mahon et al. application Serial No. 178,816, filed August 11, 1950.

The polymerization of the liquid monomer coating could be done at room temperature but the polymerization will be very slow at room temperature which is why moderate heating is desired.

I have now found that nitroalkyl amines and halides of alkenoic acids readily condense to produce N-nitroalkyl substituted amides, in accordance with the general reaction scheme set forth below:

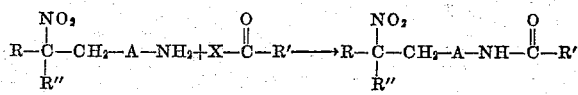

wherein A, R, R′ and R″ are as defined above, and X is a halogen radical.

As a matter of convenience, the nitroalkyl amine is usually produced in situ from the nitroalkyl amine hydrohalide salt in the presence of a base such as the alkali and alkaline earth metal alcoholates and hydroxides.

The amines useful as starting materials in this invention are prepared by reacting their corresponding isocyanates with strong mineral acids. A wide variety of isocyanates are obtained for this purpose by reacting acid halides with sodium azide to form the organic azide and subsequently pyrolyzing to yield the desired isocyanates, as disclosed in my copending application Serial No. 405,515, filed January 21, 1954, now Patent No. 2,923,723.

To more clearly illustrate my invention, the following example is presented. It should be understood, however, that this example is presented merely as a means of illustration and is not intended to limit the scope of the invention in any way.

EXAMPLE

*Preparation of N-3,3-dinitrobutyl acrylamide*

A flask provided with thermometer, stirrer and dropping funnel was charged with 160 gm. 3,3-dinitrobutyl amine hydrochloride in 1200 ml. water. 1000 ml. ether was added and the mixture stirred while a solution of 40 gm. sodium hydroxide in 200 ml. water was added slowly. The ether layer was then separated and placed in another flask provided with a stirrer and thermometer. While maintaining a temperature of 20-25° C., a solution of 32 ml. acrylyl chloride in 150 ml. absolute ether was added over a period of 5 minutes. The mixture was stirred for an hour and then filtered. The ether solution was washed with water, aqueous sodium bicarbonate and again with water. The concentrated ether solution gave 58 gm. of N-3,3-dinitrobutyl acrylamide which after recrystallization had a M.P. of 38-39.5° C.

I have also found that by proceeding in accordance with the example given above, 4,4-dintropentyl amine will condense with acrylic acid chloride to produce N-4,4-dinitropentyl acrylamide; 3,3-dinitrobutyl amine will condense with crotonic acid chloride to produce N-3,3-dintrobutyl crotonamide; 3,3,3-trinitropropyl amine will condense with acrylic acid chloride to produce N-3,3,3,-trinitropropyl acrylamide; and 3-nitrobutyl amine will condense with acrylic acid chloride to produce N-3-nitrobutyl acrylamide.

The reaction is preferably run at a temperature in the range of from about 0° to about 35° C. The reaction can be performed at higher temperatures; however, it is preferred to run the reaction at reduced temperatures to permit better control of the reaction rate.

From the above discussion it is apparent that the entire class of N-nitroalkyl substituted amides can be readily prepared by merely condensing an appropriate amine with an appropriate acid halide, in accordance with the teachings of this invention.

I claim:

1. The method of preparing N-nitroalkyl substituted amides having the general formula:

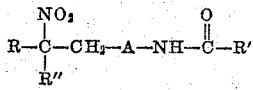

which comprises condensing an alkenoic acid halide with an amine having the general formula:

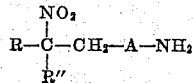

wherein A is a lower alkylene radical, R′ is a lower alkenyl radical, and R and R″ are radicals selected from the group consisting of hydrogen, alkyl and nitro radicals.

2. The method of preparing N-nitroalkyl substituted amides having the general formula:

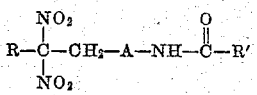

which comprises reacting an alkenoic acid halide with a nitro containing amine having the general formula:

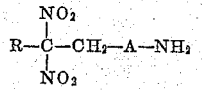

wherein A is a lower alkylene radical, R is an alkyl radical, and R′ is a lower alkenyl radical.

3. The method of claim 2 wherein the amine is produced in situ from the amine hydrohalide salt in the presence of a base selected from the group consisting of alkali and alkaline earth metal alcoholates and hydroxides.

4. The method of preparing N-3,3-dinitrobutyl acrylamide which comprises reacting 3,3-dinitrobutyl amine with an acrylic acid halide.

5. The method of claim 4 wherein the acrylic acid halide is acrylic acid chloride.

6. The method of preparing N-4,4-dinitropentyl acrylamide which comprises reacting 4,4-dinitropentyl amine with an acrylic acid halide.

7. The method of claim 6 wherein the acrylic acid halide is acrylic acid chloride.

8. The method of preparing N-3,3-dinitrobutyl crotonamide which comprises reacting 3,3-dinitrobutyl amine with a crotonic acid halide.

9. The method of claim 8 wherein the crotonic acid halide is crotonic acid chloride.

10. The method of preparing N-3,3,3-trinitropropyl acrylamide which comprises reacting 3,3,3-trinitropropyl amine with an acrylic acid halide.

11. The method of claim 10 wherein the acrylic acid halide is acrylic acid chloride.

12. The method of preparing 3-nitrobutyl acrylamide which comprises reacting 3-nitrobutyl amine with an acrylic acid halide.

13. The method of claim 12 wherein the acrylic acid halide is acrylic acid chloride.

14. The method of preparing N-nitroalkyl substituted amides having the general formula:

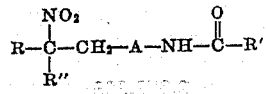

which comprises condensing an alkenoic acid halide with an amine having the general formula:

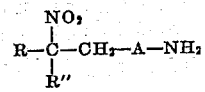

wherein A is a lower alkylene radical, R' is a lower alkenyl radical, and R and R'' are radicals selected from the group consisting of hydrogen, alkyl and nitro radicals at a temperature of from about 0° to about 35° C.

References Cited in the file of this patent

UNITED STATES PATENTS 2,950,312    Quadflieg _____ Aug. 23, 1960

OTHER REFERENCES

Wertheim: "Textbook of Organic Chemistry," 2nd ed., The Blakiston Co., Philadelphia (1945), pp. 308–310.